(12) United States Patent
Halfmann et al.

(10) Patent No.: US 8,331,291 B2
(45) Date of Patent: Dec. 11, 2012

(54) METHOD AND DEVICE FOR DATA COMMUNICATION AND COMMUNICATION SYSTEM COMPRISING SUCH DEVICE

(75) Inventors: Ruediger Halfmann, Otterberg (DE); Jijun Luo, München (DE); Egon Schulz, München (DE); Yikang Xiang, München (DE)

(73) Assignee: Nokia Siemens Networks Oy, Espoo (FI)

( * ) Notice: Subject to any disclaimer, the term of this patent is extended or adjusted under 35 U.S.C. 154(b) by 162 days.

(21) Appl. No.: 12/682,925

(22) PCT Filed: Oct. 15, 2008
(Under 37 CFR 1.47)

(86) PCT No.: PCT/EP2008/063886
§ 371 (c)(1),
(2), (4) Date: Sep. 20, 2010

(87) PCT Pub. No.: WO2009/050205
PCT Pub. Date: Apr. 23, 2009

(65) Prior Publication Data
US 2011/0090793 A1    Apr. 21, 2011

(30) Foreign Application Priority Data
Oct. 17, 2007   (EP) .................................... 07020318

(51) Int. Cl.
*H04W 4/00*   (2009.01)

(52) U.S. Cl. .......................... 370/328; 370/332; 370/252
(58) Field of Classification Search ............... 370/241.1, 370/255, 285, 346, 349, 389, 390
See application file for complete search history.

(56) References Cited

U.S. PATENT DOCUMENTS

| | | | |
|---|---|---|---|
| 7,197,317 B2 * | 3/2007 | Parkvall et al. | 455/452.1 |
| 8,155,016 B2 * | 4/2012 | Zhang et al. | 370/252 |
| 2003/0189909 A1 | 10/2003 | Chao et al. | 370/331 |
| 2008/0019320 A1 * | 1/2008 | Phan et al. | 370/331 |
| 2008/0285500 A1 | 11/2008 | Zhang et al. | 370/315 |
| 2009/0191874 A1 * | 7/2009 | Du et al. | 455/436 |
| 2010/0275087 A1 * | 10/2010 | Doppler et al. | 714/749 |

FOREIGN PATENT DOCUMENTS

| | | |
|---|---|---|
| EP | 1 361 707 A2 | 11/2003 |
| WO | WO 2005/055636 A1 | 6/2005 |
| WO | WO 2006/024320 A1 | 3/2006 |

OTHER PUBLICATIONS

Universal Mobile Telecommunications System (UMTS); Radio Link Control (RLC) protocol specification (3GPP TS 25.322 version 7.0.0 Release 7) ETSI TS 125 322 V7.0.0 (Mar. 2006).

* cited by examiner

*Primary Examiner* — Brenda H Pham
(74) *Attorney, Agent, or Firm* — Harrington & Smith

(57) ABSTRACT

A method and a device are provided for data communication between a first instance and a second instance, the method including the step of: The first instance issues a first status report to the second instance either via a third instance or directly.

20 Claims, 7 Drawing Sheets

| | |
|---|---|
| D/C | PDU type |
| SUFI₁ | SUFI₁ |
| ... | |
| SUFIₖ | |
| PAD | |

Oct 1
Oct2
OctN

Fig.6

| Bit | PDU Type |
|---|---|
| 000 | STATUS |
| 001 | RESET |
| 010 | RESET ACK |
| 011-111 | Reserved (PDUs with this coding will be discarded by this version of the protocol). |

Fig.7

METHOD AND DEVICE FOR DATA COMMUNICATION AND COMMUNICATION SYSTEM COMPRISING SUCH DEVICE

The invention relates to a method and to a device for data communication and to a communication system comprising such a device.

In future Public Land Mobile Networks (PLMNs), relay nodes (RNs) may be deployed in addition to regular base stations (BS) in order to provide seamless mobility with homogeneous data rate.

A user-plane protocol architecture as proposed between the base station and the user terminal in 3GPP LTE has a structure according to FIG. 1. The protocol stacks at the base station and the user terminal each comprise a Packet Data Convergence Protocol (PDCP) layer, a Radio Link Control (RLC) layer, a Media Access Control (MAC) layer and a physical (PHY) layer providing the functions for the user-plane traffic, e.g., header compression, ciphering, scheduling, Automatic Repeat-Request (ARQ) and/or Hybrid Automatic Repeat-Request (HARQ).

In a Relay Enhanced Cell (REC) topology for the future Radio Access Network (RAN), one cell may comprise one base station and several relay nodes. The relay nodes could be wirelessly connected to the base station of the same cell.

Depending on a specific location and on a radio propagation condition, the user terminal within the cell may connect either via the relay node to the base station or it may connect to the base station directly.

Basically, for a decode-and-forward type of relay, there may be scenarios where the relay node is deployed with or without the RLC layer as shown in FIG. 2 and in FIG. 3.

As standardized in 3GPP ETSI TS 125 322 V7.0.0 (2006-03), the RLC layer could have three modes of operation, i.e. a transparent mode, an unacknowledged mode (UM) and an acknowledged mode (AM). Only the acknowledged mode comprises an automatic retransmission request (ARQ) operation.

If the RLC (sub-)layer is absent at the relay node (see FIG. 3), the RLC operation is provided between the base station and the user terminal only. In such case, RLC layer ARQ operations, e.g., transmission of polling, status report, and data retransmission all have to traverse the two hops, making the error recovery rather slow.

If the RLC functionality is available on the relay node (see FIG. 2), the two hops could have separate RLC ARQ operations for local error recovery, which is usually faster. This is called per-hop RLC hereinafter.

However, in case of mobile handover from the relay node to the base station, if per-hop RLC is the choice, the buffered data on the RLC of the relay node for the particular user terminal would be deleted and may not be recovered by the base station as they may have already been acknowledged by the RLC entity on the relay node. Hence, two kinds of handovers may result in a data loss: First, a handover of the user terminal from the relay node to the base station within the same cell. Second, a handover of the user terminal from the relay node to another cell (i.e., another base station).

Hence, there exists in particular the problem that the RLC layer provided with the relay node is not able to support fast local error recovery without the risk of losing data during handover operation from the relay node to the base station.

This problem is solved according to the features of the independent claims. Further embodiments result from the depending claims.

In order to overcome this problem, a method for data communication between a first instance and a second instance is provided comprising the following step:
 the first instance issues a first status report to the second instance either via a third instance or directly.

It is noted that the approach suggested is applicable in downlink as well as in uplink direction.

For example, the following analogy may apply:

|  | Downlink | Uplink |
| --- | --- | --- |
| First Instance | User Terminal UT | Base Station BS |
| Second Instance | Base Station BS | User Terminal UT |
| Third Instance | Relay Node RN | Relay Node RN |

Regarding in particular a handover scenario, the third instance may be a serving base station and the second instance may be a target base station or vice versa.

It is to be further noted that the user terminal may be a mobile terminal of various kind, it may further be a device comprising a functionality of a mobile terminal. The mobile terminal may also be a user equipment UE.

The approach provided herewith is applicable in any kind of communication environment, in particular in a 3GPP or WiMAX scenario.

According to this solution provided, an RLC protocol may be amended to better suit various needs of a relay-enhanced-cell (REC).

Herein, it is in particular discussed an impact to an REC topology on the RLC AM operation, and its enhancement thereto.

In an embodiment, the second instance is a primary sender of data.

In another embodiment, the first instance directly issues the first status report if it was connected to the third instance before.

This allows to significantly reduce an overall time required for the second instance to transmit a polling command or request. It further allows the second instance to be informed of the first instance's status substantially immediately after a handover has been completed.

In a further embodiment, the third instance is a relay node.

In a next embodiment, the third instance is a network element with a reduced protocol stack.

It is also an embodiment that the third instance comprises a physical layer, a MAC layer and an RLC layer.

Pursuant to another embodiment, the third instance comprises a physical layer and a MAC layer.

According to an embodiment, the first status report comprises information about data that has been received at the first instance.

According to another embodiment, the first status report comprises an RLC status report.

In yet another embodiment, the first status report is utilized for handover purposes.

According to a next embodiment, a first instance's connection to the third instance is handed over to the second instance.

Pursuant to yet an embodiment, the third instance polls the status of the first instance and forwards it to the second instance.

According to a further embodiment, the third instance relays a polling conducted by the second instance to the first instance.

According to yet another embodiment, the first instance sends the first status report to the second instance after completion of the handover.

It is another embodiment that the first status report is utilized for flow control purposes.

According to a particular embodiment, the third instance issues a second status report to the second instance.

Hence, the first status report and the second status report are available at the second instance.

It is yet an embodiment that the second status report comprises an RLC status report.

Pursuant to an embodiment, a buffering status of the third instance is determined, in particular calculated, by the second instance by utilizing the first status report issued by the first instance and the second status report issued by the third instance. Based on such information, the second instance may adjust the buffering status of the third instance by increasing or decreasing the sending rate in particular towards the first instance. This is in particular referred to as flow control.

According to an embodiment, the second instance does the flow control by adjusting its RLC sending window and/or by instructing its MAC layer to schedule more/less data to the first instance.

The problem stated above is also solved by a device for comprising a processor unit that is equipped and/or arranged such that the method as described herein is executable on said processor unit.

According to an embodiment, the device is a communication device, in particular a network element.

According to yet another embodiment, the device is or is associated with a user terminal, a base station and/or a relay node.

The problem stated supra is further solved by a communication system comprising the device as described herein.

Embodiments of the invention are shown and illustrated in the following figures:

FIG. 4 shows a relay node status report forwarding mechanism, depicting a base station BS, a relay node RN and a user terminal UT, each of which comprising a protocol stack in particular with a MAC layer and an RLC layer;

FIG. 5A visualizes message flows between a Serving BS (e.g., the relay node RN), the user terminal UT and a Target BS (e.g., the base station BS);

FIG. 6 shows a 3GPP release 7 RLC status PDU structure comprising a 3-bit PDU type field;

FIG. 7 shows possible values for the PDU type field of FIG. 6.

According to an embodiment, in particular downlink RLC data transmission in the acknowledged mode (AM) is described. However, the scenario described is also applicable with regard to uplink data transmission.

The approach provided herein in particular comprises the following mechanisms:
a. RLC status report forwarding by the relay node (RN);
b. RLC sender side flow control with RN buffer status awareness for two-hop communication sections;
c. Topology aware status report for multi-hop system enabling a homogeneous load distribution among several, in particular all, hops;
d. Immediate Status report directly after handover, i.e. handover-triggered status report.

RLC Status Report Forwarding by the Relay Node (RN)

In order to have lossless data transfer during a "RN-BS handover", i.e. a handover of a call-leg between the relay node and the user terminal to a call-leg between the base station and the user terminal, the base station RLC entity may advantageously be informed of the receiving status of the RLC at the user terminal.

Figure 1:
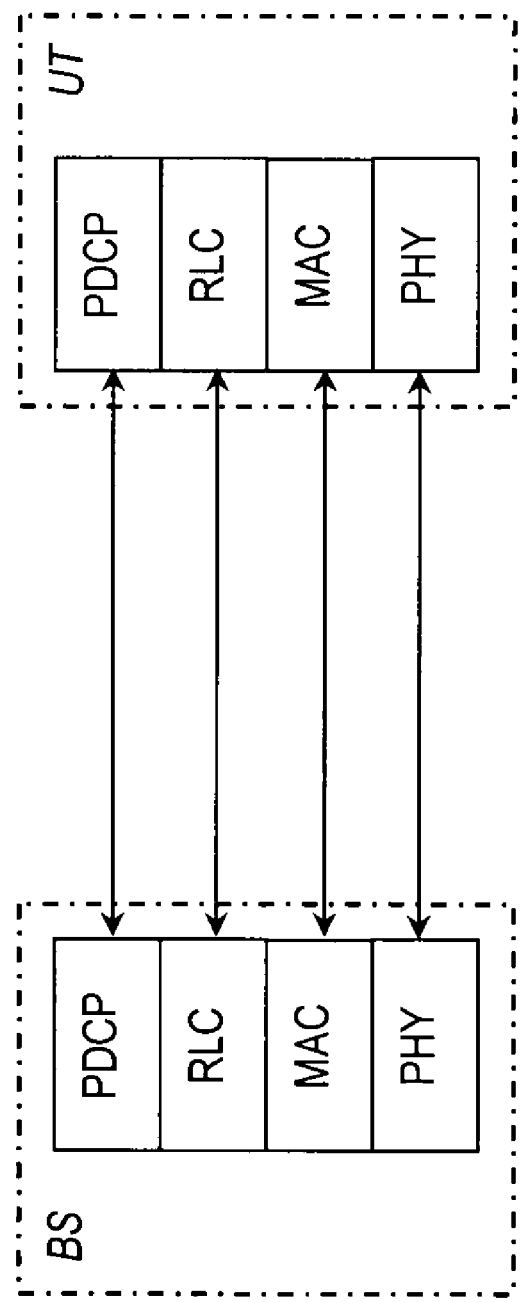
Figure 2:
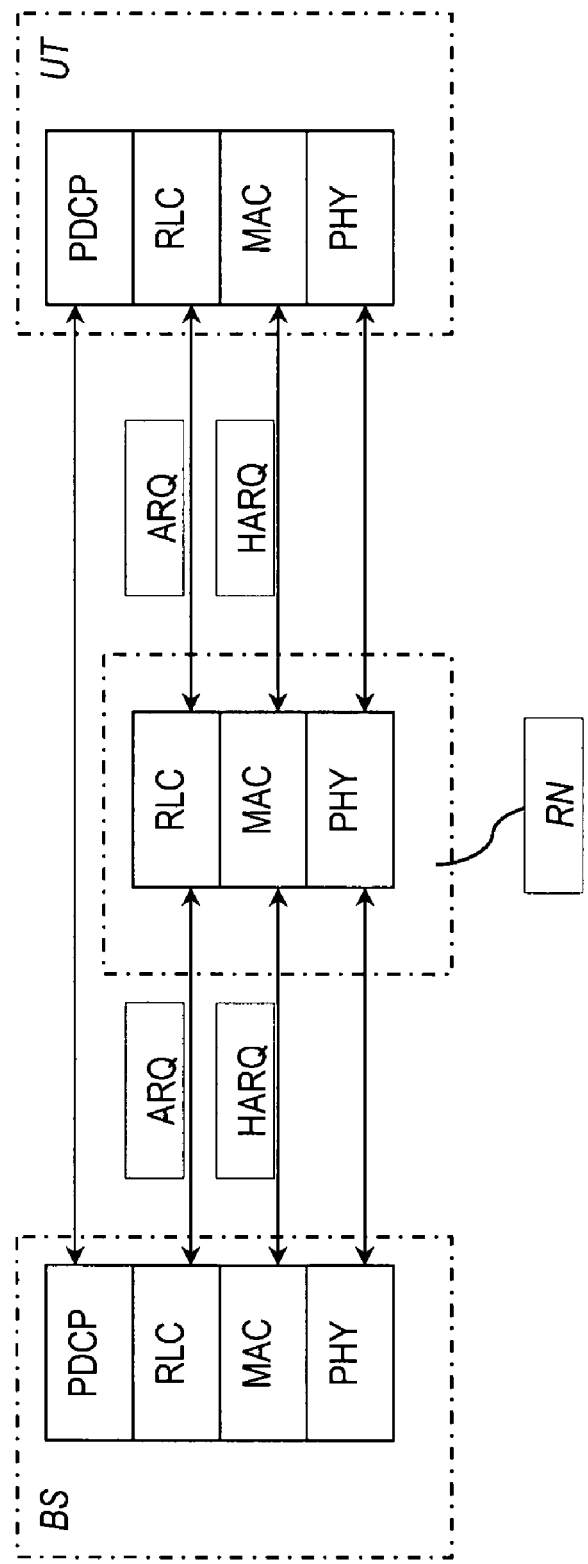
Figure 3:
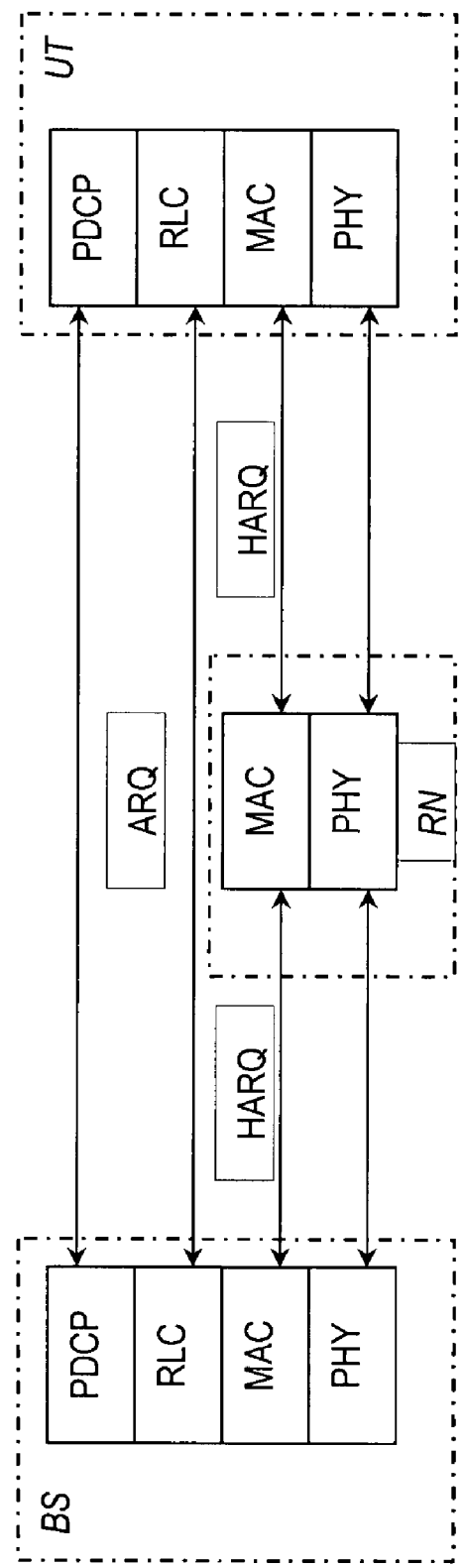
Figure 4:
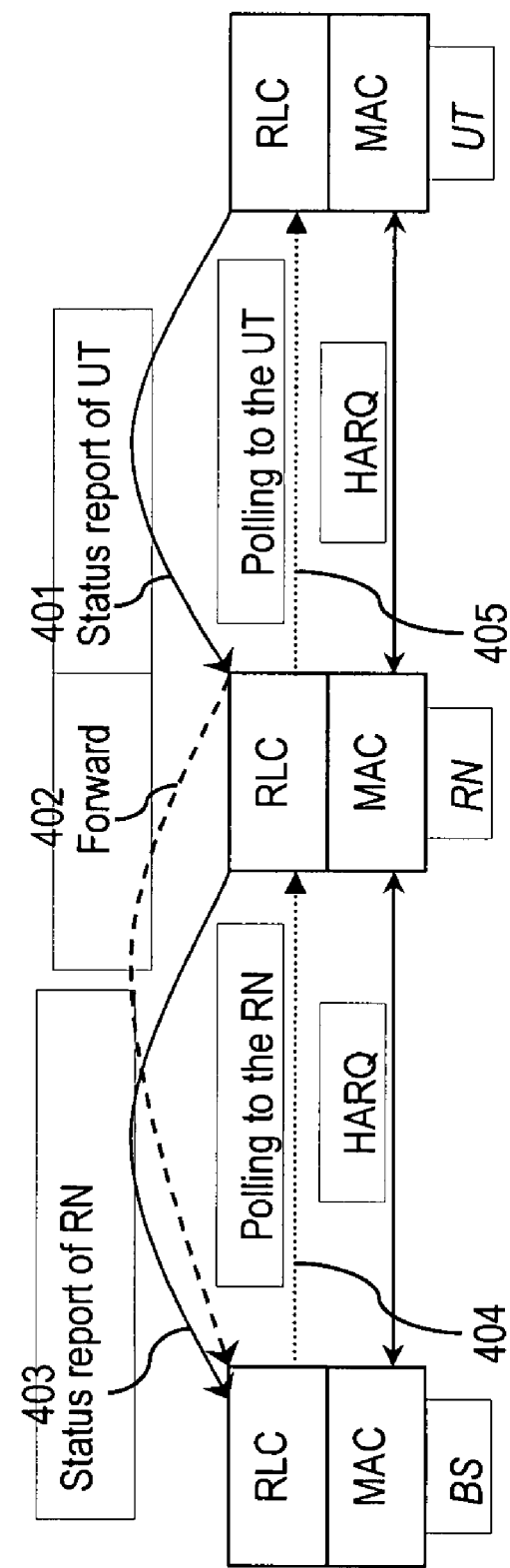

This can be achieved by having the relay node forward the RLC status report issued by the user terminal back to the base station (see FIG. 4 for illustration purposes).

FIG. 4 shows a relay node status report forwarding mechanism. It depicts a base station BS, a relay node RN and a user terminal UT, each of which comprising a protocol stack in particular with a MAC layer and an RLC layer.

The base station BS receives a status report 401 issued by the user terminal UT that is forwarded 402 to the base station BS by the relay node RN. In addition, the base station BS receives a status report 403 issued by the relay node RN itself.

The user terminal's RLC status report 401 may be triggered by a polling request issued by the relay node RN. The RLC layer at the base station BS may (only) poll the relay node's RLC status report (both polling requests are indicated by the dashed lines 404 and 405 in FIG. 4).

At the base station BS side, the status report 403 issued by the relay node RN and the status report 402 issued by the user terminal UT have to be distinguished. This may in particular be achieved by providing a one-bit indicator in the RLC header of the status reports 402, 403. Advantageously, this would result in a minor modification of the existing protocol only.

The RLC Acknowledged Mode (AM) operation at the base station BS still takes place according to the status report of the relay node RN (local error recovery). However, the RLC layer of the base station BS does advantageously not delete Protocol Data Units (PDUs) that have been acknowledged by the relay node RN, but not yet by the user terminal UT.

Figure 5A:
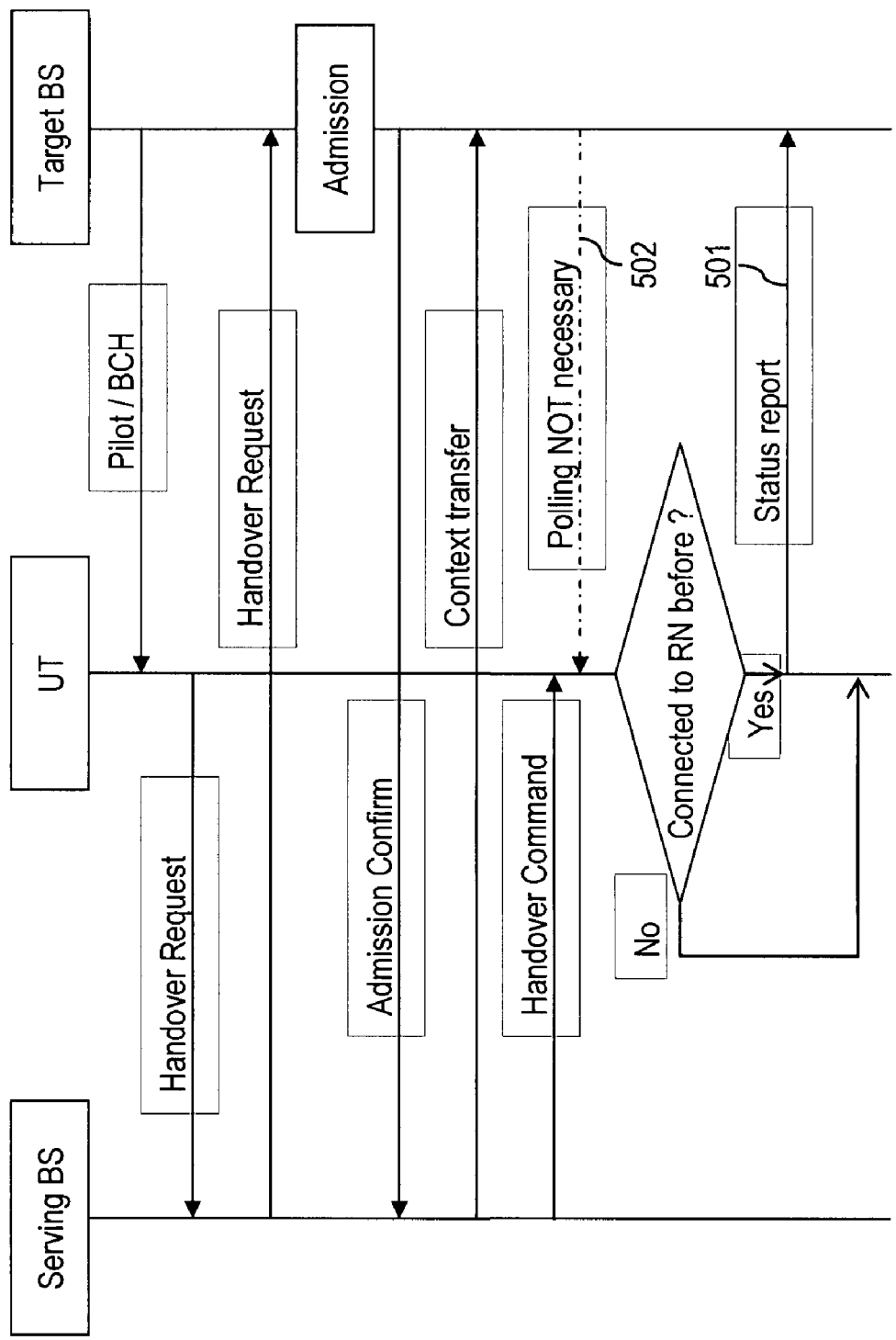
FIG. 5B shows a scenario of intra-cell RN-BS handover between a relay node RN, a Serving BS and the user terminal UT.
Figure 5B:
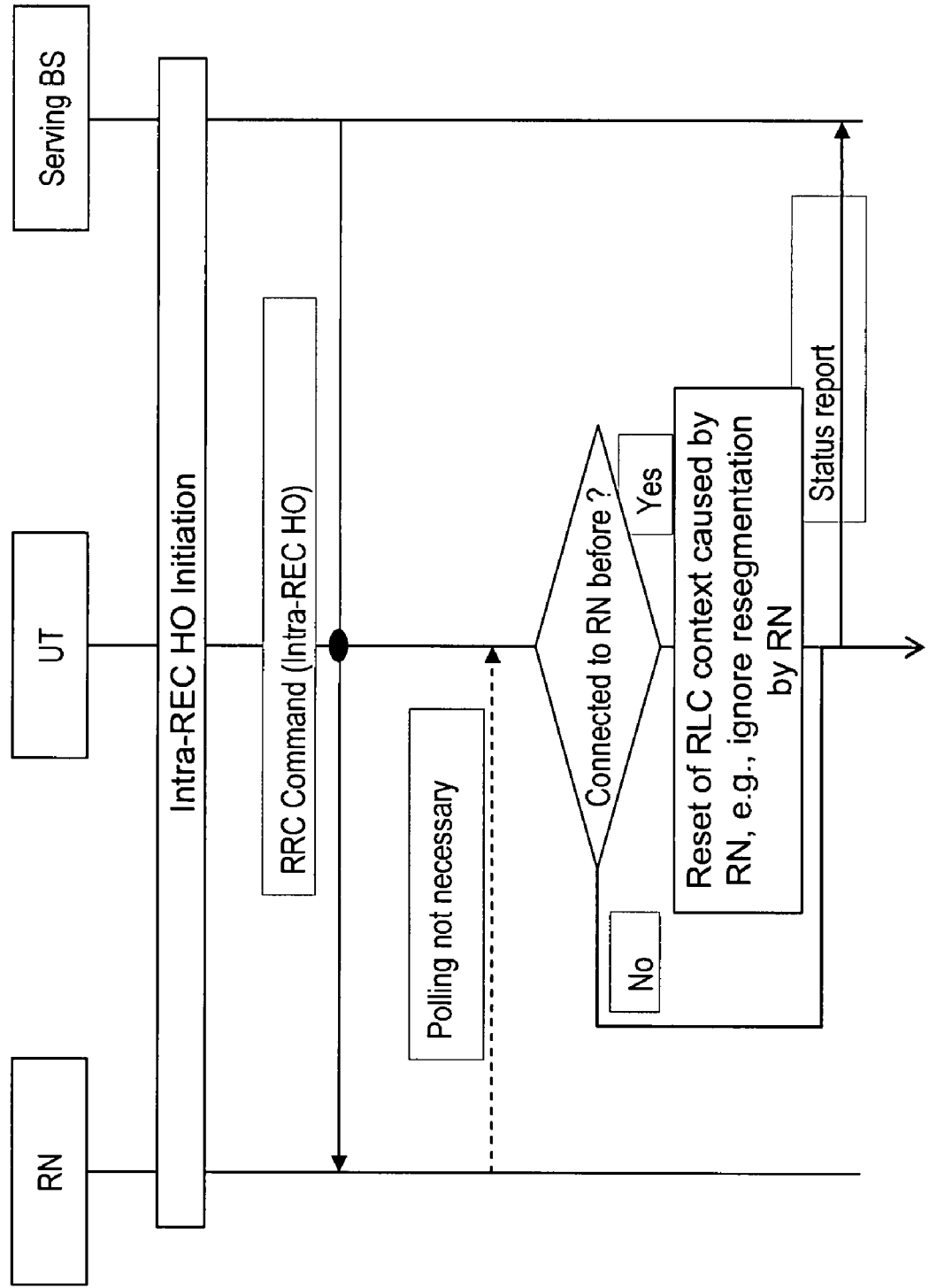

FIG. 5B shows a scenario of intra-cell RN-BS handover. When said intra-cell RN-BS handover happens, the user terminal UT tears down its connection with the relay node RN and it establishes a direct connection with the base station BS.

In such case, the relay node RN may clear its buffer for that user terminal UT, thereby deleting the buffered data on its RLC layer no matter whether or not said data has been acknowledged by the user terminal UT. It may happen that before intra-cell handover (HO), the RN re-segments the RLC PDU from the serving BS to the UT. The RLC context caused by RN may not remain after handover (see FIG. 5B).

The base station BS, however, may clear its RLC context (timer, sending window, etc.) regarding the previous connection with the relay node RN. Since the base station BS is aware of the user terminal's receiving status pursuant by the UT status report forwarded from the RN, the base station BS may re-start RLC transmission to the user terminal UT beginning with the first unacknowledged PDU.

In order for the base station BS to be kept updated about the user terminal's receiving status, the relay node RN may poll the user terminal UT frequently enough and thereupon the relay node may without significant delay forward the status report from the user terminal UT back to the base station BS.

As an alternative, the relay node RN may also relay the polling from the base station BS to the user terminal UT, hence, the relay node may initiate a polling request towards the user terminal UT when the relay node itself is being polled by the base station BS.

The status report that is received from the UT as a result to the polling request could be separately forwarded or piggy-backed by the relay node RN to the base station BS via data PDUs.

When the RN-BS handover is initiated, the relay node RN may advantageously without significant delay poll the user terminal UT again in order to obtain the latest status report. This latest status report is forwarded to the base station BS.

However, as the polling needs to be transmitted via a data PDU, it may not have enough time to reach the user terminal UT before handover is completed.

In order to also cover this scenario, the user terminal UT may send a status report back to the base station BS (advantageously without significant delay) immediately after the handover is completed. This can be also referred to as a "handover-triggered status report" and is depicted in FIG. 5A.

FIG. 5A visualizes message flows between a Serving BS (e.g., the relay node RN), the user terminal UT and a Target BS (e.g., the base station BS).

The Target BS indicates it availability by a Pilot sequence conveyed via a broadcast channel. The user terminal UT sends a Handover Request to the Serving BS, which in return sends a Handover request to the Target BS. After the Handover request has been admitted by the Target BS, it sends an Admission Confirm message back to the Serving BS. The Serving BS sends a Handover Command to the user terminal UT.

The user terminal UT checks whether it has been connected to the relay node (i.e., the Serving BS) before. In the affirmative, the user terminal sends a RLC Status Report 501 to the Serving BS, otherwise, it does not send such an RLC Status Report to the Serving BS.

FIG. 5A shows in particular the example of an inter-cell handover. Such self-initiated status report 501 conveyed by the user terminal UT saves the time for the Target BS to transmit the polling command 502.

Hence, the Target BS is immediately informed of the status of the user terminal UT after handover has been completed. Therefore, any chance of duplicated data packets, in particular due to an outdated user terminal status knowledge at the Target BS, as well as packet loss is significantly reduced.

As of the relay node RN status report forwarding mechanism, the base station BS knows about the status of the user terminal UT and it can be advantageously avoided that the base station deletes any PDUs that are acknowledged by the relay node RN, but not by the user terminal UT. Therefore, data loss can be reduced or avoided in case of handover. Further, the per-hop RLC scheme successfully maintains the efficiency of error recovery in the Relay Enhancement Cell (REC).

It has to be noted that in the per-hop RLC scheme, the same RLC SN (sequence number) may be maintained for the same PDU transmitted on the first and the second RLC connection.

Furthermore, the RLC link on either one of the two hops may not be reset independent of the respective other hop, since this could result in inconsistency of the RLC status on the two hops. The RLC operation may be only reset for the complete BS-RN-UT path.

RLC Sender Side Flow Control with Relay Node (RN) Buffer Status Awareness

The RLC layer operation includes flow-control functionality via an RLC sending/receiving window operation.

However, in the Relay Enhanced Cell (REC) case, the normal RLC sending window controls only one single hop from the sender RLC layer to its receiver RLC layer. Overflow or underflow on the relay node RN may happen in case the channel condition is quite different on the two hops.

Considering, e.g., FIG. 4, the first hop depicted is between the base station BS and the relay node RN, the second hop is between the relay node RN and the user terminal UT. Data shall—according to this example—be conveyed from the base station BS to the user terminal UT.

The base station BS may convey too many data packets per time to the relay node RN via said first hop, whereas the relay node RN is not able to forward the data packets at this rate via the second hop. Hence, the second hop may be a bottleneck in this example causing an overflow of the relay node RN buffer. In a similar manner, the opposite may apply regarding an underflow example.

The principle of flow control is to let the RLC layer on the relay node RN have a suitable size of buffered data PDUs in order to avoid underflow as well as overflow situations.

The relay node RN buffering size depends on the arriving rate of the data sent by the base station BS, as well as on the sending rate of this relay node's MAC layer towards the user terminal UT.

Given certain scheduling policy and channel condition, a possibility to control the buffering size of the relay node RN is to control the sending rate at the base station BS.

Since the base station BS receives both, the status report 403 of the relay node RN and the forwarded status report 402 of the user terminal UT, the base station BS is able to determine the buffering status at the relay node RN based on the difference of both status reports 402 and 403.

When the relay node RN buffers too much data for the user terminal UT, the base station BS gets aware of this and could refrain from sending more data at a high rate to the relay node RN until such overflow situation is alleviated.

On the other hand, the base station BS is also able to determine an underflow situation at the relay node RN and hence it may increase its sending data rate for this particular user terminal UT, either by increasing an RLC sending window size, or by instructing the MAC layer to schedule more data for this user terminal UT.

Another benefit to keep the RLC buffering size at a suitable level is to avoid excessive retransmission in case of an RN-BS handover. In such scenario, less data may in particular be deleted from the relay node RN buffer.

Further Advantages

The relay node RN forwarding the status report issued by the user terminal UT back to the base station BS may have many benefits, in particular:
  to prevent data loss during a RN-BS handover;
  to facilitate a flow control by letting the base station BS know the (actual) relay node RN buffering status.

The same principles as set forth herein for the downlink situation applies to the uplink, according to which the relay node RN forwards the status report from the base station BS back to the user terminal UT.

Only one bit of RLC header extension may be utilized to realize such functionality. Such a single bit may not have to be added to the existing RLC header structure. Instead, existing reserved bits of the RLC header may be utilized for this purpose.

For example, FIG. 6 shows a 3GPP release 7 RLC status PDU structure comprising a 3-bit PDU type field (see also 3GPP TS 25.322). Possible values for this PDU type field are shown in FIG. 7.

Currently, only 3 values are defined (000, 001, 010), the remaining 5 values are reserved only, but may be utilized to indicate whether this status PDU belongs to the relay node RN or to the user terminal UT.

The approach suggested herewith in particular comprises the following advantages:
  It is not necessary to re-transmit data packets from the source termination in a multi-hop network (fast local error recovery);
  A premature clean-up of a buffer is avoided.
  There is no major change to the current RLC protocol required.

No explicit signaling for per-hop flow control is necessary due to the possibility to adjust the flow control based on status reports.

Downlink polling signaling from the target BS is reduced and hence the handover process is sped up.

Homogeneous load distribution among multi-hop is enabled due to the implicit flow control.

Abbreviations

3GPP Third Generation Partnership Project
AM Acknowledged Mode
ARQ Automatic Retransmission Request
BS Base Station
HARQ Hybrid Automatic Repeat-Request
LTE Long Term Evolution
MAC Media Access Control
PDCP Packet Data Convergence Protocol
PDU Protocol Data Unit
PLMN Public Land Mobile Network
REC Relay Enhanced Cell
RLC Radio Link Control
RN Relay Node
RRC Radio Resource Control
SN Sequence Number
TCP Transmission Control Protocol
UE User Equipment
UM Unacknowledged Mode
UMTS Universal Mobile Telecommunications System
UT User Terminal

The invention claimed is:

1. A method for data communication between a user terminal (UT) and a base station (BS) via a relay node (RN) comprising the following steps:
    the user terminal issues a first status report, and the relay node (RN) forwards the first status report to the base station, wherein the first status report is utilized for handover purposes,
    wherein the relay node issues a second status report to the base station, and
    wherein a buffering status of the relay node is determined by the base station by utilizing the first status report issued by the user terminal and the second status report issued by the relay node.

2. The method according to claim 1, wherein the base station is a primary sender of data.

3. The method according to claim 1, wherein the user terminal directly issues the first status report if the user terminal was connected to the relay node before.

4. The method according to claim 1, wherein the relay node is a network element with a reduced protocol stack.

5. The method according to claim 4, wherein the relay node comprises a physical layer, a MAC layer and an RLC layer.

6. The method according to claim 4, wherein the relay node comprises a physical layer and a MAC layer.

7. The method according to claim 1, wherein the first status report comprises information about data that has been received at the user terminal.

8. The method according to claim 1, wherein the first status report comprises an RLC status report.

9. The method according to claim 1, wherein a connection of the user terminal to the relay node is handed over to the base station.

10. The method according to claim 1, wherein the relay node polls the status of the user terminal and forwards the polled status to the base station.

11. The method according to claim 1, wherein the relay node relays a polling conducted by the base station to the user terminal.

12. The method according to claim 1, wherein the user terminal sends the first status report to the base station after completion of a handover.

13. The method according to claim 1, wherein the first status report is utilized for flow control purposes.

14. The method according to claim 1, wherein the second status report comprises an RLC status report.

15. The method according to claim 1, wherein the base station adjusts the buffering status by increasing or decreasing the sending rate.

16. The method according to claim 1, wherein the base station adjusts the buffering status by adjusting an RLC sending window and/or by instructing the MAC layer to schedule more/less data to the user terminal.

17. A device comprising:
    at least one processor unit; and
    at least one memory including instructions,
    the at least one processor unit being configured, in response to executing the instructions, to cause the device to perform a method for data communication between a user terminal (UT) and a base station (BS) via a relay node (RN) comprising the following steps:
    the user terminal issues a first status report, and the relay node (RN) forwards the first status report to the base station, wherein the first status report is utilized for handover purposes,
    wherein the relay node issues a second status report to the base station, and
    wherein a buffering status of the relay node is determined by the base station by utilizing the first status report issued by the user terminal and the second status report issued by the relay node.

18. The device according to claim 17, wherein said device is a communication device.

19. The device according to claim 17, wherein the device is or is associated with a user terminal, a base station and/or a relay node.

20. Communication system comprising a device, said device including:
    at least one processor unit; and
    at least one memory including instructions,
    the at least one processor unit being configured, in response to executing the instructions, to cause the device to perform a method for data communication between a user terminal (UT) and a base station (BS) via a relay node (RN) comprising the following steps:
    the user terminal issues a first status report, and the relay node (RN) forwards the first status report to the base station, wherein the first status report is utilized for handover purposes,
    wherein the relay node issues a second status report to the base station, and
    wherein a buffering status of the relay node is determined by the base station by utilizing the first status report issued by the user terminal and the second status report issued by the relay node.

* * * * *